United States Patent [19]

Lueghamer

[11] Patent Number: 5,188,697
[45] Date of Patent: Feb. 23, 1993

[54] PROCESS AND DEVICE FOR WELDING OF TUBULAR PLASTIC PARTS

[75] Inventor: Albert Lueghamer, Bad Hall, Austria

[73] Assignee: agru Alois Gruber GmbH, Bad Hall, Austria

[21] Appl. No.: 789,807

[22] PCT Filed: Mar. 17, 1988

[86] PCT No.: PCT/EP88/00216
§ 371 Date: Apr. 21, 1989
§ 102(e) Date: Apr. 21, 1989

[87] PCT Pub. No.: WO88/06966
PCT Pub. Date: Sep. 22, 1988

Related U.S. Application Data

[63] Continuation-in-part of Ser. No. 283,276, Apr. 21, 1989, abandoned.

[30] Foreign Application Priority Data

Mar. 18, 1987 [DE] Fed. Rep. of Germany ....... 3708705

[51] Int. Cl.[5] ................. B29C 65/20; B29C 65/30
[52] U.S. Cl. .................. 156/499; 156/158; 156/304.2; 156/304.5; 156/304.6; 156/507
[58] Field of Search ............ 156/158, 304.2, 304.5, 156/304.6, 499, 507; 219/535

[56] References Cited

U.S. PATENT DOCUMENTS

| | | | |
|---|---|---|---|
| 3,013,925 | 12/1961 | Larsen | 156/153 |
| 3,276,941 | 10/1966 | Burns | 156/304.5 |
| 3,579,826 | 5/1971 | Morain | 30/93 |
| 3,855,038 | 12/1974 | Anschutz | 156/499 |
| 4,051,218 | 9/1977 | Hotton | 264/248 |
| 4,197,149 | 4/1980 | Freitag et al. | 156/154 |
| 4,288,266 | 9/1981 | Konrad et al. | 156/158 |
| 4,419,067 | 12/1983 | Graafmann | 425/392 |
| 4,801,349 | 1/1989 | Dommer et al. | 156/304.6 |

FOREIGN PATENT DOCUMENTS

| | | |
|---|---|---|
| 0167870 | 1/1986 | European Pat. Off. . |
| 129758 | 2/1978 | Fed. Rep. of Germany . |
| 136719 | 7/1979 | Fed. Rep. of Germany ...... 156/158 |
| 2924930 | 1/1981 | Fed. Rep. of Germany . |
| 3510552 | 9/1986 | Fed. Rep. of Germany . |
| 6903614 | 9/1970 | Netherlands . |
| 423668 | 4/1974 | U.S.S.R. ............... 156/158 |
| 826526 | 1/1960 | United Kingdom . |
| 1249168 | 10/1971 | United Kingdom . |
| 1549169 | 7/1979 | United Kingdom . |

*Primary Examiner*—Michael G. Wityshyn
*Attorney, Agent, or Firm*—Fisher, Christen & Sabol

[57] ABSTRACT

Device for joining of tubular parts (10, 11) made from plastic, especially polyvinylidene fluoride, polypropylene or polyethylene, in which aligned parts (10, 11) exhibiting about the same diameter are pushed together and are welded on abutting surfaces (12, 13) by effect of heat. Abutting surfaces (12, 13) of tubular parts (10, 11) in the direction of the inside pipe space are undercut or recessed so that the edge formed by inside surface (15) of tubular part (10, 11) and the abutting surface springs back opposite the edge formed by outside surface (18) of tubular part (10, 11) and abutting surface (12, 13), and so that parts (10, 11) in the area of abutting surfaces (12, 13) in the axial direction essentially are softened equally deeply, then pushed together and, as a result, are welded together. Especially wherein the heating element (20) consists of a fixed disk (23') and a heating ring (23") of metal with a PTFE-ring (21') which may be additionally fixed.

9 Claims, 3 Drawing Sheets

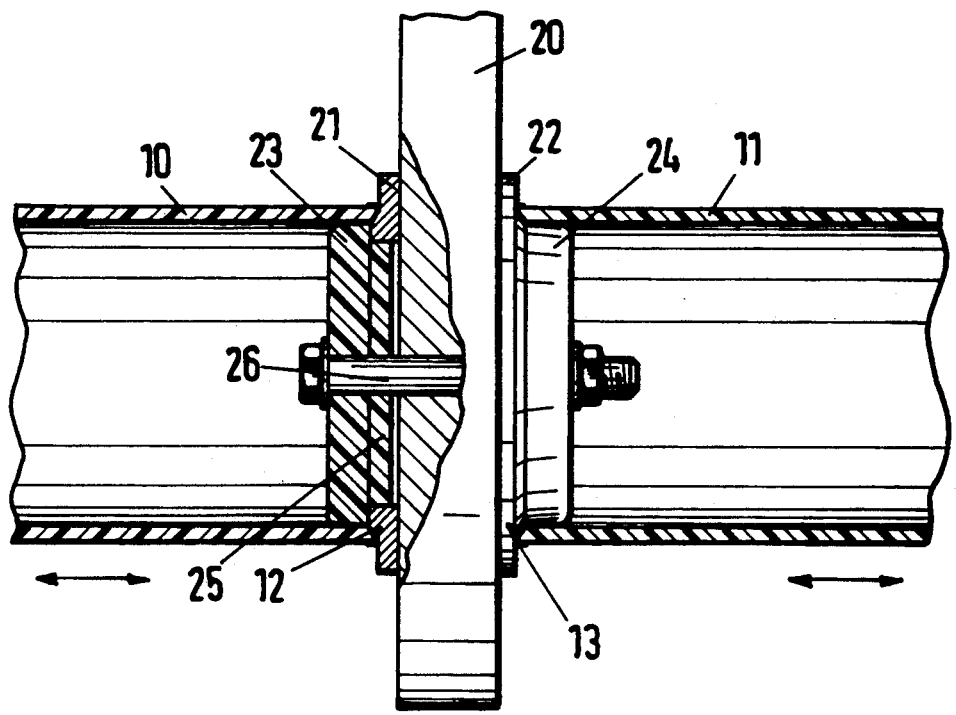
Fig.4
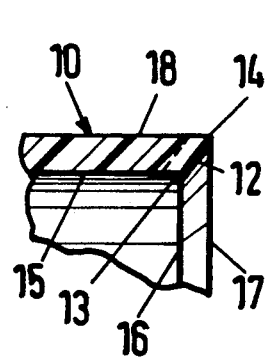
Fig.5.1
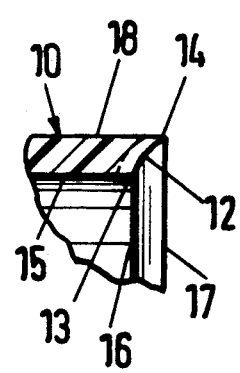
Fig.5.2
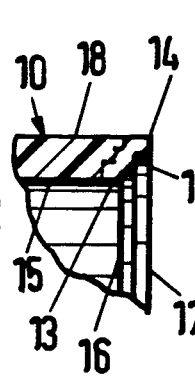
Fig.5.3
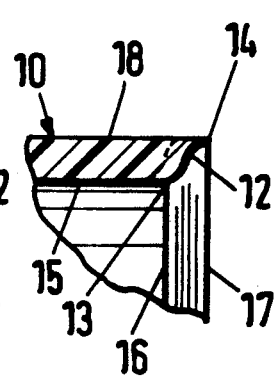
Fig.5.4

PROCESS AND DEVICE FOR WELDING OF TUBULAR PLASTIC PARTS

This application is a continuation-in-part of prior U.S. application Ser. No. 283,276 Apr. 21, 1989, now abandoned.

BACKGROUND OF THE INVENTION

1. Field of the Invention

The invention relates to a device for the joining of tubular parts made from plastic, elastically polyvinylidene fluoride, polypropylene and polyethylene (wherein the aligned parts exhibit about the same diameter) by being pushed together and welded on the abutting surfaces of the tubular parts by the effect of heat. More specifically, the invention provides a heating element for softening the area of the beveled abutting surface, of at least one tubular part, and the contact surface of the heating element on the abutting surface of the tubular part is designed corresponding to the abutting surface and is provided on a circular or disk-shaped lug on the heating element and the heating element is provided with a centering and/or calibrating lug for the tubular part.

2. Background Art

The uniting of joining of pipes, fittings or other tubular plastic parts, (e.g., made of PE, PP, PVDF, ECTFE, PPS, PEEK, etc.) heretofore has taken place by butt-welding. In this case the tubular parts are cross-cut evenly and then butt-joined. Then along the butt joint the material of the two parts to be connected is heated to the softening or melting point, whereupon the flowing togethers of the plastic of the two parts leads to a welding. Also in this know butt-welding technique, a welding bead which is at least two to four millimeters thick is formed on the inside surface of the pipe thus produced which, if it is not removed in an expensive way, entails considerable flow losses and/or deposits in the pipe in the area of these welding beads. But often it is technically impossible to machine away such welding seams later on from the pipe inside wall. In this case, an undesirable rise in the flow resistance in the pipe as well as such deposits occurs if liquids with solid particles are transported in the pipe.

Various ways for reduction of these welding beads having already been proposed. Thus DE-A-3 510 552 explains the placing of technically relatively complicated recesses along the abutting surfaces of the two pipe parts to be welded together. These recesses are softened by a tool partially filling them so that after removal of the tool the pipe parts can join one another and be connected to one another. But also in using this known process a significant inside bead appears, which leads to the already mentioned undesirable increase of the flow resistance in the pipe. Also in DD-A-197 216 it is pointed out that, i.e., mold heating elements as well as inside bevels and also reduction of the welding pressure are to lead to a reduction of the inside beads.

BROAD DESCRIPTION OF THE INVENTION

The object of the invention is to provide a device of the initially mentioned type, with which the formation of a welding bead on the inside surface of the tubular parts when they are joined from two plastic tubular parts with essentially the same diameter is practically completely prevented.

This object is achieved in the process according to the invention by the fact that the abutting surfaces of the tubular parts in the direction of the inside pipe space are undercut or recessed so that the edge formed by the inside surface of the tubular part and the abutting surface springs back opposite the edge formed by the outside surface of the tubular part and the abutting surface, and so that the parts in the area of the abutting surfaces in the axial direction essentially are softened equally in depth, then pushed together and, as a result, are welded together.

A device according to the invention is distinguished in that a heating element is provided for applying to and softening the area of the abutting surface at least of a tubular part, and the contact surface of the heating element on the abutting surface of the tubular part is designed to correspond to the undercut or recessed abutting surface.

The device according to the invention is based on the common means of undercutting the abutting surfaces of the two parts—which are to be joined—of the tubular part produced from two parts so that together with a defined softening or melting of the two tubular parts in the area of the abutting surfaces there is no reason, during the subsequent abutting together of the molten parts, for the molten plastic to flow out onto the inside surface of the tubular part that is formed and, thus, to form the inside head that has formed up to now with the prior art processes/devices. By "defined melting", it should be understood herein that the pipe walls of the two parts that are to be joined to one another are essentially equally deeply melted in the axial direction. The solid/liquid or solid/softened boundary is thus supposed to run approximately parallel or with the same contour to the abutting surface of the respective part, which is formed by undercutting or recessing. In this way, a place is created within the thickness of the pipe wall for the softened plastic which is moved when the two molten parts are abutted and up to now has flowed out on the inside wall of the formed tubular part in the form of a bead. In the process according to the invention the liquid or softened plastic, displaced during joining, remains essentially in the space formed by the undercutting or recessing and no longer appears as an obstacle adversely affecting the smooth, undiminished cross section of the pipe.

In an especially preferred embodiment of the invention in the area of the welding seam to be produced, a molded part, preferably of polypropylene, can be provided on the inside walls of the two parts to be joined. In this way, an especially smooth inside wall of the finished pipe is achieved.

However, it has been shown that in welding of pipes of sizable diameter with the device of the parent application (U.S. Ser. No. 283,276, filed Apr. 21, 1989, now abandoned) difficulties can arise in adhering to the necessary tolerances. Plastic pipes with a diameter of about 150 to 250 mm perhaps could not be welded optimally with the device of the parent case.

The object of the present invention is to provide a device for welding plastic pipes of the initially mentioned type, with which (in a reliable and thus economical way) even pipes made from plastic of said diameter can be joined to one another while adhering to the condition that the welding connection taken place practically inside bead free to avoid flow disturbances of the medium flowing in the pipes.

This object is achieved according to the invention int hat the lug as well as the centering and/or calibrating lug in each case are made from metal material and are designed as a retainer for holding a heat-resistant plastic ring with comparatively large inside diameter, and the plastic ring in the area of its outside diameter is the contact surface for the inner surface of the tubular part to be welded.

In the welding device of the parent application, the lug of the heating element as well as the centering and/or calibrating lug consists of solid polytetrafluoroethylene (PTFE), they can also be provided as two disks separated from one another. But nevertheless they consist in their entirety of said plastic. It has now been shown that the described drawbacks of a problematic tolerance accuracy of the welded joint, especially with sizable diameters, can be avoided, if in the indicated way the lug and the centering and/or calibrating lug basically consist of metal material, preferably aluminum or an aluminum alloy and if the projection thus formed on the heating element exhibits a comparatively thin plastic ring, that is with relatively large inside diameter so that during the welding process it is provided as a corresponding contact surface on the inner surface of the one pipe to be welded. It is assumed that the described tolerance difficulties with the device of the parent application are attributed especially to heat expansions or heat stresses, which come from the solid PTFE lugs of the heating element. In any case it has been surprisingly shown that the tolerance deviations, observed so far, are avoided if lugs and plastic ring are designed in the way according to the invention. In this case, it is especially important that with the device according to the invention it is possible at all for the first time to weld plastic pipes with a sizable diameter, approximately 150 to 250 mm, especially 160 to 225 mm, to one another inside bead-free.

It should also be stressed that with the device according to the present invention, which consists of aluminum lugs and plastic ring, can be produced more inexpensively than the solid plastic lug according to the device of the parent application.

In this respect, the subunit especially economical to produce, if in the area of the plastic ring it is divided parallel to its main plane. In this case, the PTFE ring can simply be inserted between the two lugs, which then are screwed together.

According to another feature of the invention it is provided that the plastic ring is radially surrounding by a projection of the lug. In this way, the plastic ring is not only reliably fastened but also a conceivable radial expansion under the influence of heat during the welding process is limited, which is especially conducive to the desired dimensional stability.

Other details, features and advantages of the invention are brought out from the following description of a preferred embodiment of the invention as well as by the diagrammatic drawing and the claims.

BRIEF DESCRIPTION OF THE DRAWINGS

In the drawings:

FIG. 4 shows an essential part of a device according to the invention for carrying out the process according to the invention;

FIGS. 5.1 to 5.4 show various configurations of beveled or undercut abutting surfaces of the pipe parts to be joined, in enlarged representation.

DETAILED DESCRIPTION OF THE INVENTION

Figure 1:
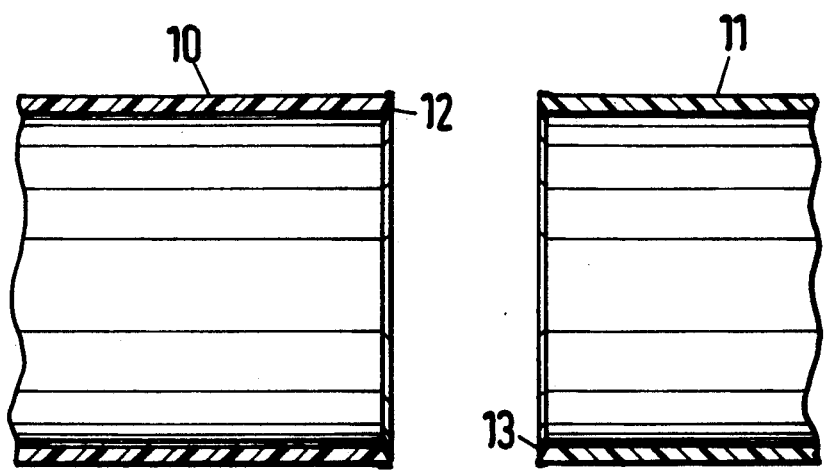
FIGS. 1 to 3 shows the welding of two plastic parts corresponding to the process according to the invention.

The two plastic pipe parts to be joined to one another, shown in FIGS. 1 to 5, are identified by numerals 10 and 11. They exhibit the same or approximately the same diameter. The plastic is polyvinylidene fluoride, polypropylene, polyethylene or a similar plastic.

Although two straight pipe pieces 10 and 11 are shown in the drawing, it is obvious that curved pipe parts can also be joined by the process according to the invention as well as the device according to the invention, just as straight pipes can be joined to elbows or curved parts. All that matters is that the two tubular parts to be joined exhibit the same or approximately the same diameter in the area of their abutting surfaces.

As brought out by the drawing and especially by the enlarged representations according to FIGS. 5.1 to 5.4, abutting surfaces 12 and 13 of the two pipe parts 10 and 11 to be welded together are made undercut or recessed, i.e., the individual pipe parts are not cut through evenly. Rather, after their separation from a longer pipe piece they are provided with recess or undercut 12. In applying the recess or undercut it is essential to see to it that the edge formed by inside surface 15 of tubular part 10 or 11 and abutting surface 12 springs back opposite the edge formed by outside surface 18 of tubular part 10 or 11 and abutting surface 12.

For the sake of completeness, it can be pointed out that abutting surfaces 12 of tubular part 11 according to FIGS. 5.1 to 5.4 are made as a mirror image of represented abutting surfaces 12 of tubular part 10, as also shown in FIGS. 1 and 4.

For welding the two tubular parts 10 and 11, abutting surfaces 12 are heated so that in the area of abutting surfaces 12 a melting or heating zone of pipe parts 10 and 12 is produced so that, on the one hand, the contour or topography of selected undercut 12 is essentially maintained and, on the other hand, the phase transition of this melt zone from liquid or softened to the solid material of pipe parts 10 and 11 also exhibits essentially the same contour as undercut or recess 12; cf. broken line representation in FIGS. 5.1 to 5.4. In other words, this softening or melting zone of the heated plastic extends equally deeply in the pipe wall in the axial direction of the pipe part independently of the respective diameter. Thus, a melting or softening area is obtained in the area of abutting surface 12, whose shape basically corresponds to that of the contour of abutting surface 12.

Figure 2:
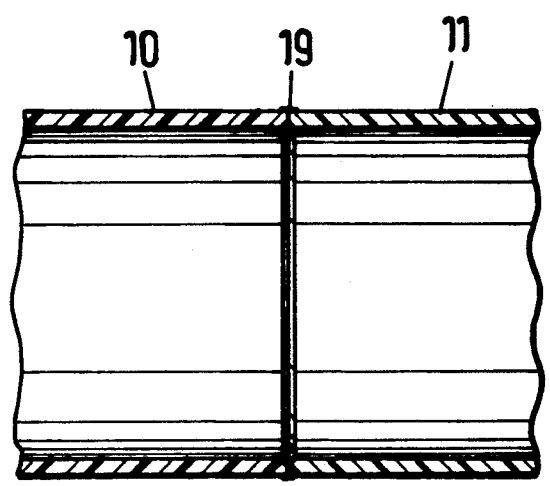

After abutting surfaces 12 of pipe parts 10 and 11 have been heated for the formation of the described melting zones, cf. FIG. 1; according to FIG. 2 they are axially pushed flush with one another. After the cooling of welding seam 19, the two tubular parts 10 and 11 are solidly joined to one another.

The essential advantage of the invention is brought out in FIG. 2. It can be seen that welding seam 19 on the inside wall of unit 10, 11 practically does not protrude, that rather an essentially smooth inside surface appears. No further explanation is necessary that in this way favorable flow conditions appear in unit 10, 11, since welding seam 19 does not obstruct at all or only barely obstructs the flow.

By the recess of undercut of abutting surface 12 according to the invention the possibility remains for the softened plastic of pipe parts 10 and 11 to accumulate, during butting of pipe parts 10 and 11, in the free space in the area of the pipe wall formed by the undercut. In other words, the softened material in the area of the inside wall of pipe parts 10 and 11 is not forced to flow out over the inside wall of the pipe parts in the free cross section. It should be noted that the conditions in the area of the outside diameter of unit 10 and 11 are different, cf. FIGS. 2 and 3. There the softened or liquid plastic material goes outward and forms the shown welding bead 19. But in such location, a welding bead is not disadvantageous for the flow in the inside space of the pipe.

Figure 3:
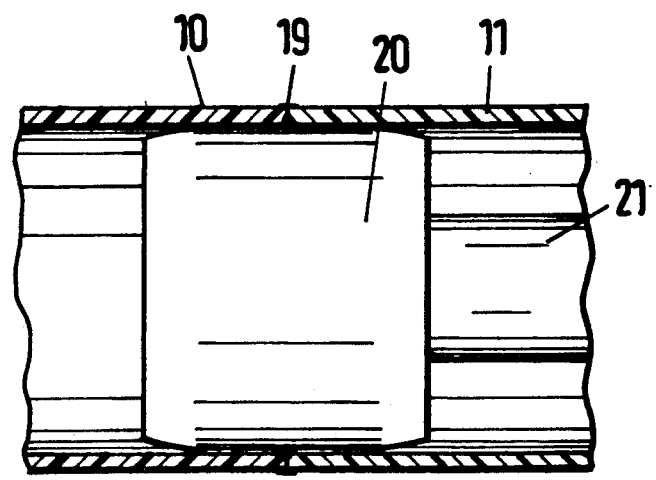

If an absolutely even inside surface is to be achieved in the joining of pipe parts 10 and 11, then, according to FIG. 3 in the area of abutting of the two pipe parts a tool 50 can be placed which rests on the inside wall and whose outside diameter is as large as the inside diameter of pipe parts 10 and 11. In this way the softened or liquid material in the area of abutting surface 12 is forced to go outward. The tool, for example, may be a polypropylene plug, which can be manipulated by a handle 21. In relation to FIGS. 1 to 3 and 5.1 to 5.4 it should also be mentioned that in the representations shown there axial sections through tubular components are involved.

In FIG. 4 again it is an axial section through two tubular parts 10 and 11 to be welded to one another with a tool for heating abutting surfaces 12 and 13. The tool is basically a heating element 20 which, for example, can be heated by electric resistance heating (not shown). For this purpose, for example, electric heating coils can be placed in ducts (again not shown). Also a heated heat exchanger liquid can flow in these ducts. As is further brought out by FIG. 4, in the preferred embodiment shown, the heating device is designed symmetrically so that the two tubular parts 10 and 11 simultaneously, when the heating element is applied in the way described above, can be heated and softened or liquefied in the area of their abutting surfaces 12 and 13. For this purpose, according to FIG. 4, there are provided laterally at heating element 20 a heating ring 21, 22 each as well as a centering and calibrating plug 23, 24. These plugs 23, 24 are used for centering and calibrating the two pipe parts 10 and 11. The two plus 23, 24 further exhibit centering lugs 25 for centering relative to ring 21. Parts 21, 22, 23, 24 and 25 are placed on heating element 20 by means of a centering screw identified as a whole by 26. Calibrating plugs 23, 24 are preferably made from polytetrafluoroethylene or a similar plastic. Rings 21, 22 are preferably made from aluminum or alloy, surface coated with TEFLON (polytetrafluoroethylene).

Heating element 20 is heated to the extent that, by heat transfer, rings 21 and 22 take on such a temperature that during contact with tubular pats 10 and 11, as represented in FIG. 4, the subsequent abutting surfaces of these parts which, as again is shown in FIG. 4, on rings 21 and 22 in the area of their abutting surfaces 12 and 13 rest all-over on rings 21 and 22, are heated to the extent that they melt or soften.

As is brought out in FIG. 4, rings 21 and 22 are designed in the area of their contact surface with subsequent abutting surfaces 12 and 13 of tubular parts 10 and 11 with respect to their topography corresponding to abutting surfaces 12 nd 13. In this way a snug contact between abutting surfaces 12 and 13 and rings 21 or 22 is achieved. In turn this contact causes a practically equally deep penetration of the heat energy from rings 21 and 22 into the area of abutting surfaces 12 and 13, so that an equally deep softening or melting of tubular parts 10 and 11 in the area of abutting surfaces 12 and 13 is achieved, as was described in detail in connection with FIGS. 5.1 to 5.4. Thus the softened area of pipe parts 10 and 11 extends equally deeply in the axial direction over the entire diameter of the pipe walls.

After this state has been reached, pipe parts 10 and 11 are moved in the direction of their longitudinal axis from heating element 20 so that heating element 20 in its entirety can be moved out from its position between the two pipe parts 10 and 11. This state corresponds to the position according to FIG. 1.

Then the two pipe parts 10 and 11 are moved together and applied to one another, whereupon, on cooling of welding seam 19 thus formed, a permanent joining of the two pipe parts 10 and 11 is achieved; cf. FIG. 2.

Then it is to be pointed out that basically it is also possible to produce the undercutting or recessing of abutting surfaces 12, 13 by rings 21, 22 melting the abutting surface, which at first is not undercut, which thus in this case runs perpendicular to the longitudinal axis of pipe parts 10 and 11, and bringing it into the undercut form as reproduced in the drawings. But in this case, special precaution must be taken to remove the plastic material in the pipe interior forced in the direction of the pipe interior.

It is also possible to provide the heating element only on one side with its ring 21 or 22 and optionally associated centering plug 23 and with this first to heat and soften only the abutting surface of one tubular part, then remove it, and then soften the abutting surface of second part 11, then push the two parts together to weld them. But with respect to cost-effective and fast production, the symmetrical design of the heating element with rings 21, 22 and centering and calibrating 23, 24 according to FIG. 4 is preferable.

Figure 6:
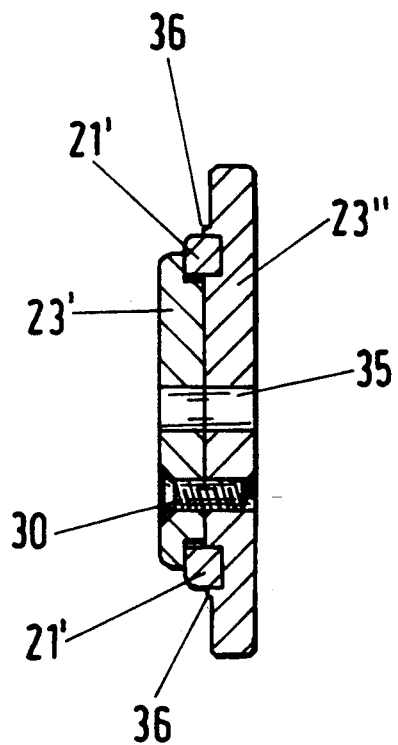
FIG. 6 shows the heating element (according to FIG. 1), further including the improvements relative to the parent application.

The improvements according to the present invention (i.e., relative to the parent application) may be seen in FIG. 6. The assembly shown therein is provided in the device according to the invention on heating element 20 instead of components 21, 23 and 25 of FIG. 4. According to the invention, they are a stabilizing lug 23' as well as a heating ring 23", which each are designed disk-shaped and produced from aluminum or an aluminum alloy. In the area of the abutting surface of the welding seam—to be produced with the device according to the invention—of pipes 10 and 11 to be welded a plastic ring is inserted in a corresponding groove between the two lugs 23' and 23". The plastic ring is preferably made from PTFE. The exposed surface of the plastic ring and disk 23" is basically the surface corresponding to the abutting surface of the pipe to be welded. The three components 21', 23' and 23" are connected to one another by one or more bolt connections with one bolt 30 each. The subassembly thus formed according to FIG. 6 is connected by a bolt 26 through recess 35 to heating element 20. During the course of the heat transfer from heating element 20 to the assembly, heating ring 23" is heated until plastic pipes 10, 11 made from polyvinylidene fluoride, polyethylene or the like in the area of their contact surfaces with the free surface of heating ring 23" are softened or melted. As can be further seen in FIG. 6, lug 23" in the area of the outside periphery of plastic ring 21' exhibits a continuous projection 36, which partially surrounds the PTFE ring in the area of its outside surface and in this way reliably holds it in its desired position. FIG. 6 further shows that PTFE ring 21' exhibits a comparatively large inside diameter. In this way, this ring 21' requires only a practically small amount of PTFE material.

The assembly, basically consisting of parts 21', 23' and 23", may be equally used in the device according to FIG. 1 instead of parts 22 and 24 shown there, so that thus again a symmetrical design of heating element 20 with its lugs, centering and/or calibrating lugs as well as the PTFE ring appears.

In case a peripheral projection 36 is provided as described, its cross-section according to FIG. 6 should be designed in such a way that it corresponds to and produces the recessed or undercut abutting surfaces of tubular parts 10 and 11 as explained in connection with FIGS. 1 to 5. During the heating procedure of the abutting surfaces the inner surfaces of parts 10 and 11 rest on the outer diameter surface of lug 23' or its oppositely arranged counterpart (not shown in FIG. 6).

What is claimed is:

1. A device for joining tubular parts made from plastic, said tubular parts exhibiting about the same diameter, said device comprising a heating element for contacting with and for softening an end surface of at least one tubular part which is intended to abut a corresponding softened end surface of another tubular part, after being joined together said softened end surfaces of said tubular parts forming a surface of abutment; wherein said heating element includes a contact surface for coming into contact with said end surface of said at least one tubular part, which surface of said heating element is designed to correspond to an undercut or recessed end surface of said at least one tubular part whereby the extent to which a bead of material formed between said tubular parts after joining extends inwardly beyond the inner walls of said tubular parts is minimized and wherein a circular or disk-shaped lug is provided on said heating element, said lug including a heating ring and an alignment disk which are both made from metal for holding therebetween a heat-resistant plastic ring, said plastic ring being sized and positioned to serve as said contact surface.

2. Device according to claim 1, wherein in the area of said abutment surface of said tubular parts is placed a molded part applied to the inside wall of said tubular parts.

3. Device according to claim 2, wherein said molded part is a polypropylene plug.

4. Device according to claim 1, wherein the end surface of said at least one tubular part may be softened and formed by a corresponding surface of said heating element to produce said undercut or recessed end surface.

5. Device according to claim 1, wherein said plastic ring in the area of the side facing away from said end surface of said tubular part is radially surrounded by a projection of said heating ring.

6. Device according to claim 1, having a subunit, said subunit consisting of said heating ring and said alignment disk, wherein, in the area of said plastic ring, said subunit is divided parallel to its largest dimension.

7. Device according to claim 1 wherein said plastic ring consists of polytetrafluoroethylene.

8. Device according to claim 1, wherein said heating ring and said alignment disk consist of aluminum or an aluminum alloy.

9. A device for joining together plastic tubular pieces of about the same diameter and minimizing the size of a bead of material formed on the interior of said tubular pieces during said joining, corresponding ends of said tubular pieces which are intended to be joined together having been recessed, said device comprising:
   (a) a heating element adapted to fit between said tubular pieces;
   (b) said heating element including two annular heating rings, one of said annular heating rings being disposed on each side of said heating element; and
   (c) the configuration of said annular heating rings being adapted to mate with said recessed ends of said tubular pieces, whereby the heating and softening of said tubular pieces by said heating element is maximized and whereby said recessed ends of said tubular pieces are heated to a substantially equal degree and depth across the thickness of said tubular pieces;
   wherein each of said heating rings includes a heating element and an alignment disk, and a plastic ring therebetween, said plastic rings being sized and positioned to come into contact with said recessed ends.

* * * * *